J. S. RITTER.
COMBINED LOCK NUT AND BUSHING FOR CONNECTION BOXES.
APPLICATION FILED APR. 16, 1908.
899,906.
Patented Sept. 29, 1908.
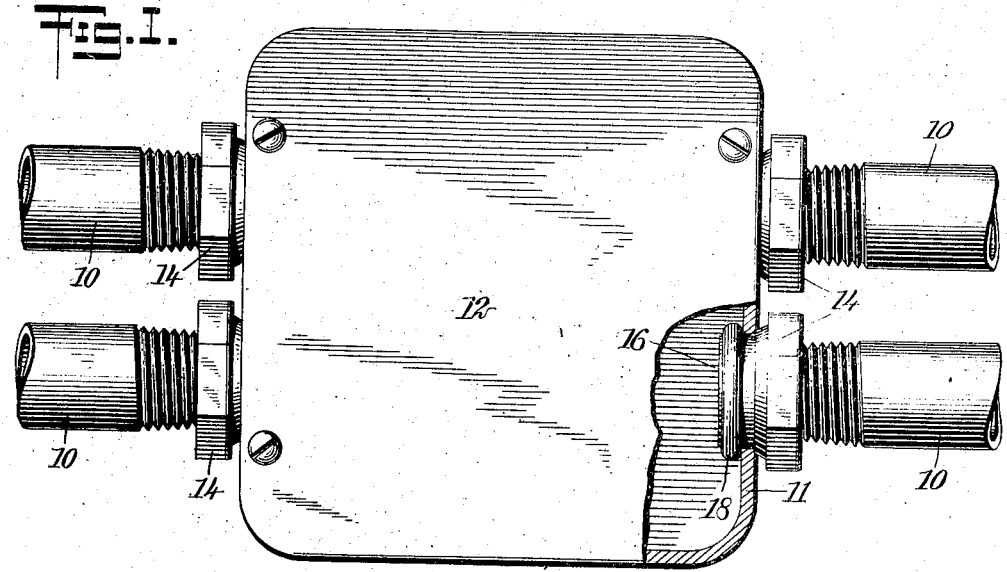
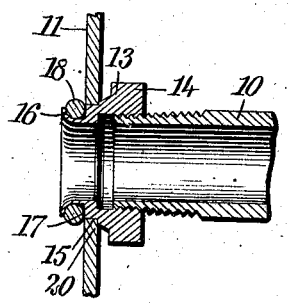
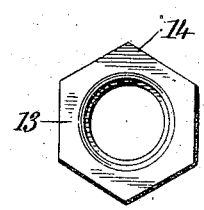
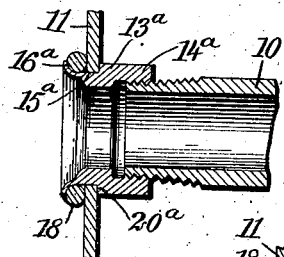
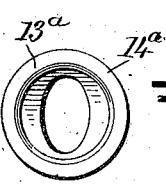
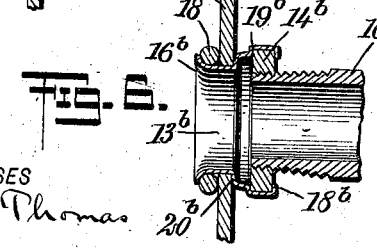
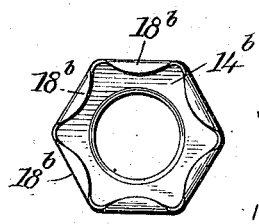
WITNESSES
G. Robert Thomas
C. W. Fairbank
INVENTOR
Joseph S. Ritter
BY
Munn & Co
ATTORNEYS

UNITED STATES PATENT OFFICE.

JOSEPH STERNER RITTER, OF ALLENTOWN, PENNSYLVANIA, ASSIGNOR OF ONE-HALF TO GEORGE F. HUMMEL, OF ALLENTOWN, PENNSYLVANIA.

COMBINED LOCK-NUT AND BUSHING FOR CONNECTION-BOXES.

No. 899,906.  Specification of Letters Patent.  Patented Sept. 29, 1908.

Application filed April 16, 1908. Serial No. 427,352.

*To all whom it may concern:*

Be it known that I, JOSEPH S. RITTER, a citizen of the United States, and a resident of Allentown, in the county of Lehigh and State of Pennsylvania, have invented a new and Improved Combined Lock-Nut and Bushing for Connection-Boxes, of which the following is a full, clear, and exact description.

This invention involves certain improvements in means for connecting the ends of pipes to the sides of boxes, or to other plates or walls, but is especially adapted for use in securing the pipes used in connection with electric wiring to the cross connection boxes.

My invention involves a body adapted for insertion through an opening in the wall of a box and threaded interiorly to receive the pipe, and having a thin annular flange adapted to be beaded over a ring to hold the body to the wall, to permit of a rotation thereof and to insure a good electrical contact.

Reference is to be had to the accompanying drawings, forming a part of this specification, in which similar characters of reference indicate corresponding parts in all the figures, and in which Figure 1 is a top plan view of a cross connection box having a plurality of pipes secured thereto by means of my improved lock nut or bushing; Fig. 2 is a longitudinal section through one form of my improved device, and a portion of a pipe and plate or wall; Fig. 3 is an end view of the device shown in Fig. 2; Fig. 4 is a view similar to Fig. 2, but showing a modified form of the device; Fig. 5 is an end view of the device shown in Fig. 4; Fig. 6 is a view similar to Figs. 2 and 4, but showing a further modification; and Fig. 7 is an end view of the device shown in Fig. 6.

My improved device is adapted for securing any kind of pipe or conduit to any form of plate or wall, but is especially designed for use in securing the end of a pipe or conduit 10 to a side wall 11, or a cross connection box 12.

The device may be in a plurality of different specific forms, but all include the same essential features. In the form shown in Figs. 1, 2 and 3, this device comprises a body 13 having an outer hexagonal head 14, interiorly threaded to receive the end of the pipe 10. Adjacent the hexagonal head is a cylindrical portion 15, adapted to closely fit the aperture in the plate or wall 11, and at the inner end of the body is a thin annular flange 16. In the formation of the body, the flange 16 is substantially cylindrical, but is of such thickness that it may be readily expanded. Adjacent the base of the flange 16 and so disposed as to lie flush with the outer surface of the wall 11, there is formed a shoulder 17, against which abuts an annular ring 18, encircling the flange 16. The ring is formed as nearly as possible of the same interior diameter as the exterior of the flange, and the exterior diameter of the ring is greater than the diameter of the aperture through the plate. The body 13 is also formed with a shoulder 20.

In assembling the device, the body or bushing may be inserted through the opening until the shoulder 20 engages with the surface of the plate. The ring 18 is then slipped onto the annular flange 16, and the flange expanded or bent to engage with the outer surface of the ring and positively retain the bushing against withdrawal from the plate. When the box is placed in position in the wall, the bushing may be rotated in its opening to screw it onto the pipe and draw the pipe and box together. In case the exact position of the bushing in the box is not determined at the time the latter leaves the shop, the flange may be very readily expanded to secure the bushing in place, after the box has been secured to the wall.

The bushing forms a good electrical contact with the box and pipe, so that the latter may serve as a return for any stray electric currents, and thus prevent danger from short-circuiting or poor contacts. The expanded inner end of the flange presents a rounded or curved surface which avoids the liability of cutting the wire or scraping or removing the insulation therefrom. The bushing may be readily rotated in the opening by the use of a wrench, and permits the pipe and box to be secured together without rotating either.

As previously stated, various changes may be made in the details of construction without departing from the spirit of my invention. For instance, it is desirable that the body have a non-cylindrical portion to permit of its being readily grasped by a wrench or other tool, but instead of providing an hexagonal head 14, as shown in Figs. 1 to 3, inclusive, I may provide the outer end of the body or bushing with a substantially cylindrical portion 14ª, as shown on the body portion 13ª in Figs. 4 and 5. To permit the body to be readily rotated by a tool, I form the aperture through the body or bushing of elliptical or other non-circular form, as indicated in Fig. 5. When the cover of the box 12 is removed, a tool may be readily inserted in the elliptical opening to rotate the bushing. In the form shown in Figs. 4 and 5, I also eliminate the shoulder 17, and form the flange 16ª flush with the outer surface of the cylindrical portion 15ª, which fits the aperture in the wall. The cylindrical portion 15ª is separated from the cylindrical portion 13ª by a shoulder 20ª.

In the forms shown in Figs. 1 to 5, inclusive, the entire bushing is formed of a single piece of metal, but I may, if desired, form it of two separate pieces, as illustrated in Figs. 6 and 7. In this form, the body is formed of an ordinary hexagonal nut 14ᵇ and a sheet metal collar 13ᵇ. One end of the collar is formed of hexagonal shape, and receives the nut, the terminal portion of the collar being provided with inturned flanges 18ᵇ, for gripping the nut against an inner flange or shoulder 19ᵇ. The collar is formed with a shoulder 20ᵇ, engaging with the outer surface of the plate 11, to limit its movement therethrough, and terminates in an inner flange 16ᵇ, which may be expanded or bent outward to engage with the ring 18 and lock the parts together, as well as present a curved surface over which the wires may pass.

Having thus described my invention, I claim as new and desire to secure by Letters Patent:

1. In combination, a connection box, a pipe, and means for securing said pipe to a wall of said box, comprising a body having a threaded opening to receive the threaded end of the pipe, a non-circular portion to permit of the rotation of said body, a shoulder adapted to engage with the outer surface of a side wall of said box, an expansible annular flange extending through the wall, and a ring encircling said flange adjacent the inner surface of the wall and held in place by said flange upon the expansion thereof.

2. A connecting means for securing a pipe to a plate, comprising a body threaded into engagement with the pipe, and adapted to extend a limited distance through an opening in the plate, the portion extending through said plate comprising a thin annular flange having an expanded inner portion, and a ring encircling said flange and held in engagement with the side of the plate by the expanded inner end of the flange.

In testimony whereof I have signed my name to this specification in the presence of two subscribing witnesses.

JOSEPH STERNER RITTER.

Witnesses:
CHARLES L. HOTTENSTEIN,
RUTH R. ABBOTT.